United States Patent
Ji et al.

(10) Patent No.: US 10,346,052 B2
(45) Date of Patent: Jul. 9, 2019

(54) MEMORY SYSTEM WITH PRIORITY PROCESSING AND OPERATING METHOD THEREOF

(71) Applicant: SK hynix Inc., Gyeonggi-do (KR)

(72) Inventors: Seung Gu Ji, Seoul (KR); Duck Hoi Koo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 15/837,664

(22) Filed: Dec. 11, 2017

(65) Prior Publication Data

US 2018/0335943 A1  Nov. 22, 2018

(30) Foreign Application Priority Data

May 17, 2017  (KR) .................. 10-2017-0061105

(51) Int. Cl.
| | | |
|---|---|---|
| *G06F 12/00* | (2006.01) | |
| *G06F 3/06* | (2006.01) | |
| *G06F 12/02* | (2006.01) | |
| *G06F 13/16* | (2006.01) | |
| *G06F 13/18* | (2006.01) | |

(52) U.S. Cl.
CPC ............. *G06F 3/061* (2013.01); *G06F 3/065* (2013.01); *G06F 3/0659* (2013.01); *G06F 3/0679* (2013.01); *G06F 12/0246* (2013.01); *G06F 12/00* (2013.01); *G06F 13/1642* (2013.01); *G06F 13/1673* (2013.01); *G06F 13/1689* (2013.01); *G06F 13/18* (2013.01); *G06F 2209/5021* (2013.01); *G06F 2212/7201* (2013.01)

(58) Field of Classification Search
CPC .... G06F 13/1642; G06F 12/00; G06F 3/0659; G06F 3/0679; G06F 13/1673; G06F 13/1689; G06F 13/18; G06F 2209/5021
USPC ........................................................ 711/103
See application file for complete search history.

(56) References Cited

U.S. PATENT DOCUMENTS

2013/0073793 A1* 3/2013 Yamagishi .............. G06F 13/16
                                                                711/103

FOREIGN PATENT DOCUMENTS

KR      1020140032789      3/2014

\* cited by examiner

*Primary Examiner* — Mardochee Chery
(74) *Attorney, Agent, or Firm* — IP & T Group LLP (57) ABSTRACT

A memory system includes a nonvolatile memory device; and a controller suitable for processing a write request of first data transmitted from a host device. The controller includes a first processing circuit suitable for generating a read command afforded with a priority, based on the write request; and a second processing circuit suitable for processing the read command according to the priority and thereby reading second data including old data of the first data from the nonvolatile memory device.

15 Claims, 5 Drawing Sheets

MEMORY SYSTEM WITH PRIORITY PROCESSING AND OPERATING METHOD THEREOF

CROSS-REFERENCES TO RELATED APPLICATION

The present application claims priority to Korean application number 10-2017-0061105, filed on May 17, 2017, which is incorporated herein by reference in its entirety.

BACKGROUND

1. Technical Field

Various embodiments of the present disclosure generally relate to a memory system. Particularly, various embodiments of the present disclosure relate to a memory system including a nonvolatile memory device.

2. Related Art

Memory systems store data provided by an external device in response to a write request. Memory systems may also provide stored data to an external device in response to a read request. Examples of external devices that use memory systems include computers, digital cameras, cellular phones, and the like. Memory systems may be embedded in an external device during manufacturing of the external devices or may be fabricated separately and then connected afterwards to an external device.

SUMMARY

Various embodiments are directed to a memory system which improves the processing speed of an unaligned write request, and an operating method thereof.

In an embodiment, a memory system may include: a nonvolatile memory device; and a controller suitable for processing a write request of first data transmitted from a host device, the controller including a first processing circuit suitable for generating a read command afforded with a priority, based on the write request; and a second processing circuit suitable for processing the read command according to the priority and thereby reading second data including old data of the first data from the nonvolatile memory device.

In an embodiment, a memory system may include: a nonvolatile memory device; and a controller suitable for processing a write request of first data transmitted from a host device, the controller including a priority queue and a normal queue; a first processing circuit suitable for storing a read command in the priority queue and storing a write command in the normal queue, based on the write request; and a second processing circuit suitable for processing the priority queue prior to the normal queue, wherein the second processing circuit reads second data including old data of the first data from the nonvolatile memory device, based on the read command.

In an embodiment, a controller may include: first and second queues; a first processing circuit suitable for, in response to write request for a recent version of unaligned data included in source data, queueing in the first queue a read command for the source data including old version of the unaligned data and queueing in the second queue a write command for the source data including the recent version; and a second processing circuit suitable for controlling the memory device to perform operations in response to commands queued in the first queue prior to commands queued in the second queue.

In an embodiment, a method for operating a memory system may include: receiving a write request for first data, from a host device; generating a read command afforded with a priority, based on the write request; generating a write command based on the write request; processing the read command according to the priority, and thereby reading second data including old data of the first data from the nonvolatile memory device; and processing the write command based on the second data, and thereby writing the first data in the nonvolatile memory device.

In an embodiment, the method for operating a memory system may further include storing the read command in a priority queue, wherein commands stored in the priority queue are processed prior to other commands.

In an embodiment, the writing may include generating modified second data by replacing the old data in the second data with the first data and writes the modified second data in the nonvolatile memory device.

In an embodiment, the generating of the read command may include determining whether one or more sector addresses allocated to the first data by the host device are unaligned with physical addresses of the nonvolatile memory device; and generating the read command depending on a determination result.

The memory system and the operating method thereof according to the embodiments may improve the processing speed of an unaligned write request.

BRIEF DESCRIPTION OF THE DRAWINGS

The above and other features and advantages of the present invention will become more apparent to those skilled in the art to which the present invention belongs by describing various embodiments thereof with reference to the attached drawings in which.

DETAILED DESCRIPTION

Hereinafter, a data storage device and an operating method thereof according to the present invention will be described with reference to the accompanying drawings through exemplary embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains can enforce the technical concepts of the present invention.

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "Includes," and "Including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present invention will be described in detail with reference to the attached drawings.

Figure 1:
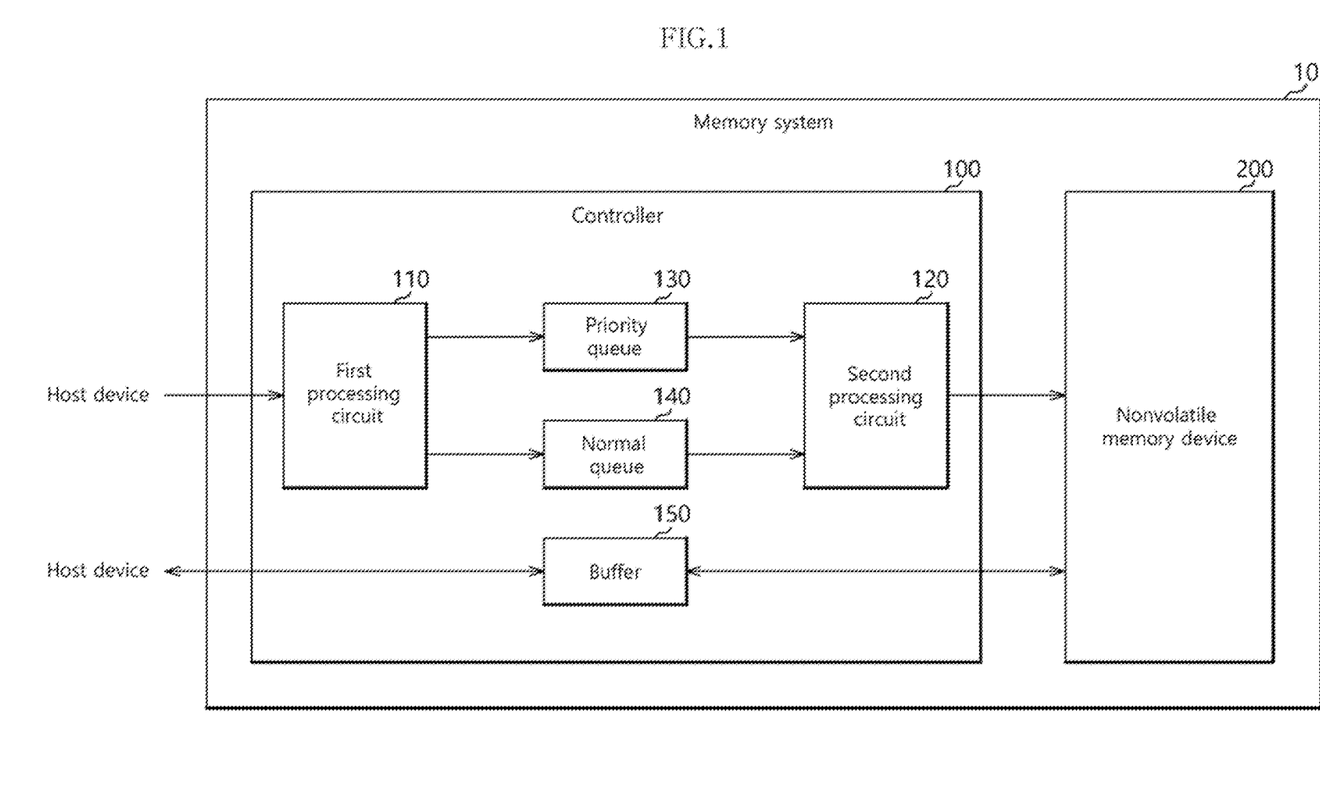
FIG. 1 is a block diagram illustrating a memory system in accordance with one embodiment of the present disclosure.

FIG. 1 is a block diagram illustrating a memory system 10 in accordance with one embodiment of the present disclosure.

The memory system 10 may store data provided from a host device (not shown), in response to a write request from the host device. Also, the memory system 10 may provide the stored data to the host device, in response to a read request from the host device.

The memory system 10 may be prepared in the form of a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD), and the like.

The memory system 10 may include a controller 100 and a nonvolatile memory device 200.

The controller 100 may control general operations of the memory system 10. For example, the controller 100 may store data in the nonvolatile memory device 200 in response to a write request transmitted from the host device. In this regard, the controller 100 may perform a write operation in different ways depending on whether write-requested data (hereinafter, referred to as write data) is unaligned data or aligned data. Unaligned data may be data of which the sector addresses are unaligned with a physical address, and aligned data may be data of which the sector addresses are aligned with a physical address. A sector address may be an address which is matched to data by the host device, and a physical address may be an actual address of the nonvolatile memory device 200. As will be described below in detail, the size of unaligned data may be smaller than the size of data corresponding to a single physical address.

Further, a write request of the host device may be classified into an aligned write request or an unaligned write request. The aligned write request may be a write request of which write data includes only aligned data. The unaligned write request may be a write request of which at least a portion of write data is unaligned data.

As will be described later, the controller 100 may require more complicated processes to write unaligned data in the nonvolatile memory device 200, when compared to aligned data. The controller 100 of the present embodiment may prioritize processes of certain activities associated with a write operation such that it does not take too long time to write unaligned data.

The controller 100 may include a first processing circuit 110, a second processing circuit 120, a priority queue 130, a normal queue 140, and a buffer 150.

The first processing circuit 110 may generate a command to be executed by the second processing circuit 120 based on a host request, such as a write request and a read request, transmitted from the host device. The first processing circuit 110 may store a generated command in the priority queue 130 or the normal queue 140 such that the second processing circuit 120 executes the command according to the priority thereof.

In particular, the first processing circuit 110 may generate a read command for unaligned data based on an unaligned write request for the unaligned data from the host device, and store the read command in the priority queue 130. In response to the read command for the unaligned data, the second processing circuit 120 may read source data including old data of the unaligned data from the nonvolatile memory device 200. The old data may correspond to the same sector addresses as the unaligned data, and therefore, the unaligned data may be more recent data than the old data for the corresponding sector addresses. Unlike the old data that is unaligned with a physical address, the source data may be aligned with a physical address. In other words, the source data may correspond to a certain single physical address.

After storing the read command in the priority queue 130, the first processing circuit 110 may generate a special write command for the unaligned data based on the unaligned write request from the host device, and store the special write command in the normal queue 140. In response to the special write command, the second processing circuit 120 may generate modified source data by replacing the old data with the unaligned data in the read source data, and may write the modified source data in the nonvolatile memory device 200.

Also, the first processing circuit 110 may generate a normal write command for aligned data based on an aligned write request from the host device, and store the normal write command in the normal queue 140.

Furthermore, even when an unaligned write request from the host device is received along with write data including aligned write data as well as unaligned write data, the first processing circuit 110 may generate a normal write command for the corresponding aligned write data as well as a read command for the corresponding unaligned write data, and store the normal write command for the corresponding aligned write data in the normal queue 140 while storing the read command for the corresponding unaligned write data in the priority queue 130.

In response to the normal write command of the normal queue 140, the second processing circuit 120 may write the aligned data in the nonvolatile memory device 200, without reading and replacing the old data of the aligned data. Since the old data of the aligned data is aligned with and matched to at least one physical address, it may be invalidated by the unit of a physical address.

The second processing circuit 120 may process a command stored in the priority queue 130 prior to a command stored in the normal queue 140. Thus, in response to the read command for the unaligned data stored in the priority queue 130, the second processing circuit 120 may perform a read operation for the unaligned data prior to operations in response to commands stored in the normal queue 140. The second processing circuit 120 may read the source data including the old data of the unaligned data from the nonvolatile memory device 200 based on the read command. The second processing circuit 120 may process commands of the priority queue 130 on a first-come-first-serve basis.

After processing all the commands of the priority queue 130, the second processing circuit 120 may process commands stored in the normal queue 140. The second processing circuit 120 may process commands of the normal queue 140 on a first-come-first-serve basis. Hence, the second processing circuit 120 may process the special write command stored in the normal queue 140 according to a queueing order of the commands in the normal queue 140. The second processing circuit 120 may generate modified source data by replacing the old data in the source data with the unaligned data and write the modified source data in the nonvolatile memory device 200 based on the special write command.

The priority queue 130 may store a command of a higher priority than a command stored in the normal queue 140. For example, the priority queue 130 may store the read command for the unaligned data as described above.

The normal queue 140 may store a command of a lower priority than a command stored in the priority queue 130. For example, the normal queue 140 may store the special write command for the unaligned data. In addition, the normal queue 140 may store the normal write command for the aligned data and other commands such as a read command based on a simple read request from the host device.

The buffer 150 may store data transmitted between the host device and the nonvolatile memory device 200.

The nonvolatile memory device 200 may store data transmitted from the controller 100 and read out stored data and transmit read-out data to the controller 100, according to the control of the controller 100. The nonvolatile memory device 200 may perform a write operation and a read operation based on physical addresses provided by the controller 100.

The nonvolatile memory device 200 may include a plurality of memory cells (not shown). As is well known in the art, the plurality of memory cells may be disposed in a two-dimensional array or a three-dimensional array. Each of the memory cells may store at least one bit. For example, one bit may be stored in each memory cell when the memory cell is a single level cell (SLC), and at least two bits may be stored in each memory cell when the memory cell is a multilevel cell (MLC).

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the memory system 10 includes one nonvolatile memory device 200, it is to be noted that the present disclosure is not limited thereto, and the memory system 10 may include more than one nonvolatile memory devices.

Figure 2:
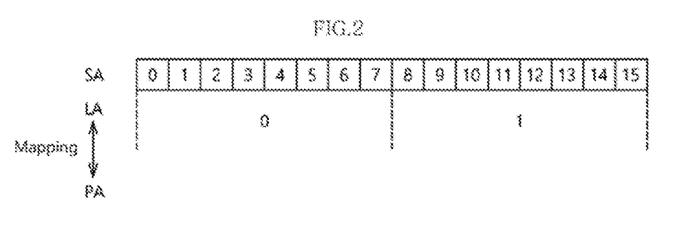
FIG. 2 is a diagram describing an address mapping method of a controller.

FIG. 2 is a diagram describing an address mapping method of the controller 100.

Referring to FIG. 2, the host device may transmit a write request along with write data, to which sector addresses SA are allocated by the unit of a first size (e.g., 512 bytes). The controller 100 may manage addresses by the unit of a second size (e.g., 4 Kbytes) larger than the first size.

In detail, the controller 100 may convert successive sector addresses SA into a logical address LA by the unit of the second size. For example, successive sector addresses SA of "0" to "7" may be converted into a logical address LA of "0," and successive sector addresses SA of "8" to "15" may be converted into a logical address LA of "1." Namely, sector addresses SA may be converted into a logical address LA through a simple arithmetic calculation, e.g., division, according to the ratio of the first size to the second size. Write data corresponding to a predetermined number of sector addresses SA (e.g., the eight successive sector addresses SA of "0" to "7") may correspond to a logical address LA (e.g., the logical address LA of "0") which is converted from the predetermined number of sector addresses SA.

The controller 100 may map a logical address LA to a physical address PA by the unit of the second size (e.g., 4 Kbytes). A memory region, which is indicated by a physical address PA in the nonvolatile memory device 200, may store the data of a logical address LA mapped to the physical address PA. The mapping relationship between a logical address LA and a physical address PA may be managed through map data.

As described above, when one or more sector addresses SA allocated to write data are aligned with physical addresses PA, a corresponding write request may be an aligned write request. For example, a write request for the sector addresses SA of "0" to "7" and/or "8" to "15" may be an aligned write request. Moreover, the corresponding write data may be aligned data.

Conversely, when one or more sector addresses SA allocated to write data are unaligned with physical addresses PA, a corresponding write request may be an unaligned write request. For example, a write request for the sector addresses SA of "2" and "3" may be an unaligned write request.

Also, a write request for the sector addresses SA of "4" to "15" may be an unaligned write request as well. However, in write data, data of the sector addresses SA of "8" to "15" is aligned data, and data of the sector addresses SA of "4" to "7" is unaligned data. That is to say, write data may include aligned data and unaligned data. Therefore, the controller 100 may write aligned data of write data in the same manner as processing an aligned write request, and may write unaligned data in a manner to be described below.

Figure 3:
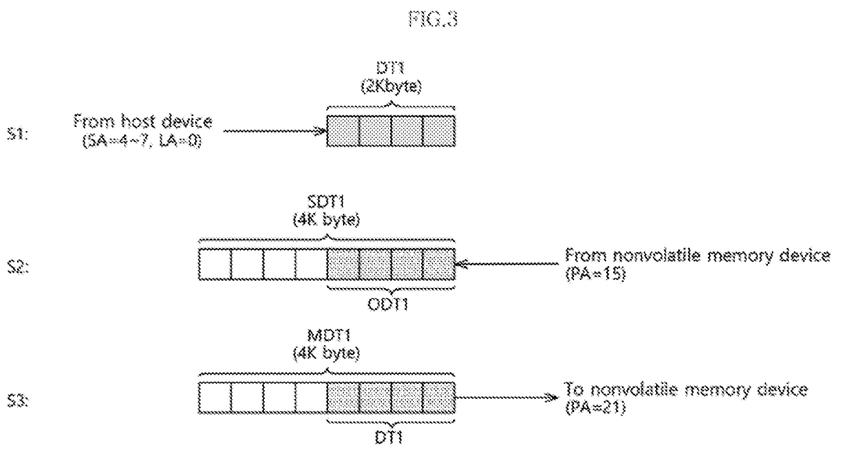
FIG. 3 is a diagram describing a method of processing an unaligned write request of first data.

FIG. 3 is a diagram describing a method of writing unaligned data DT1.

Referring to FIG. 3, at step S1, the host device may allocate four successive sector addresses SA of "4" to "7" to unaligned data DT1 of, for example, 2 Kbytes, and transmit an unaligned write request. The sector addresses SA of "4" to "7" will be converted into a logical address LA of "0" according to the conversion principle of FIG. 2.

At step S2, the controller 100 may read source data SDT1 including old data ODT1 of the unaligned data DT1 from the nonvolatile memory device 200 based on the unaligned write request. The old data ODT1 may be previously allocated to the sector addresses SA of "4" to "7" and is written in the nonvolatile memory device 200. When the logical address LA of "0" is mapped to a predetermined physical address PA of "15," the source data SDT1 may be read from the memory region of the physical address PA of "15." That is to say, the source data SDT1 may be previously allocated to the sector addresses SA of "0" to "7" and is written in the nonvolatile memory device 200. The source data SDT1 may be aligned with the physical address PA, and the size thereof may be 4 Kbytes corresponding to a single physical address PA.

At step S3, the controller 100 may generate modified source data MDT1 by replacing the old data ODT1 in the source data SDT1 with the unaligned data DT1, and write the modified source data MDT1 in the nonvolatile memory device 200. The modified source data MDT1 may be written in the memory region of, for example, a new physical address PA of "21." The source data SDT1 stored in the memory region of the physical address PA of "15" may be invalidated, and be erased afterward. In this way, the unaligned write request may be completed.

Meanwhile, writing aligned data does not require reading of source data and replacement of old data. For example, in the case where an aligned write request for aligned data of sector addresses SA of "0" to "7" is received, the aligned data may be written in the nonvolatile memory device 200 as it is. Old data of the aligned data (in this case, the entire source data SDT1 of FIG. 3 will be old data) may be invalidated by the unit of a physical address. In other words, since aligned data may be invalidated by the unit of a physical address, as shown in FIG. 3, it is not necessary to write the aligned data by a method for retaining remaining valid data except the old data ODT1 in the source data SDT1.

Figure 4:
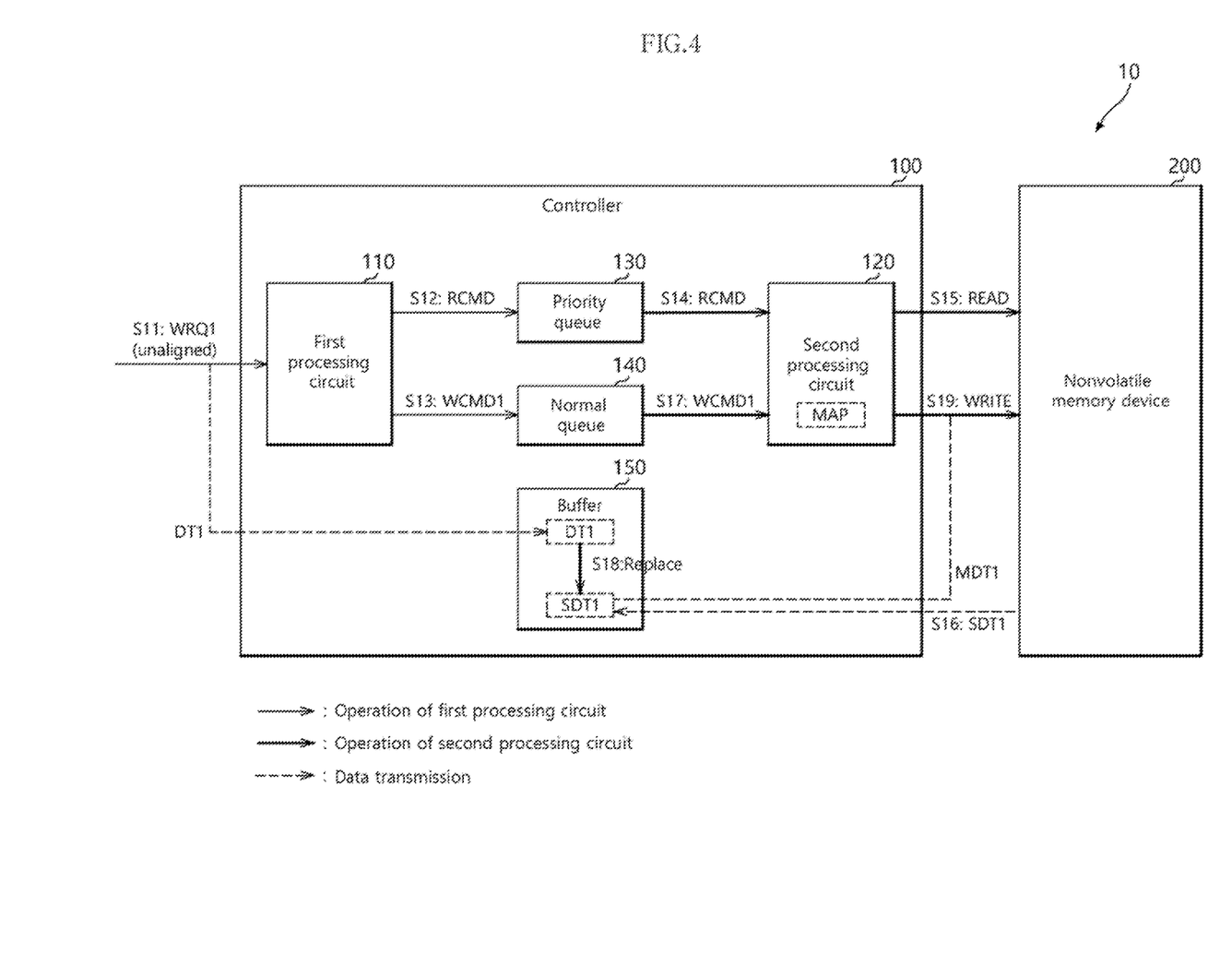
FIG. 4 is a diagram describing a method for the controller of FIG. 1 to process an unaligned write request.

FIG. 4 is a diagram describing in detail a method for the controller 100 of FIG. 1 to process an unaligned write request WRQ1 provided along with unaligned data DT1. While write data provided along with the unaligned write request WRQ1 may include aligned data in addition to the unaligned data DT1, a method for writing the aligned data is omitted in FIG. 4, and may be performed in a manner similar to that shown in FIG. 5.

Referring to FIG. 4, at step S11, the first processing circuit 110 may receive the unaligned write request WRQ1 for the unaligned data DT1 from the host device. The unaligned data DT1 may be stored in the buffer 150. The unaligned write request WRQ1 may include an information on sector addresses allocated to the unaligned data DT1.

At step S12, the first processing circuit 110 may generate a read command RCMD based on a logical address converted from the sector addresses of the unaligned data DT1, and store the read command RCMD in the priority queue 130.

At step S13, the first processing circuit 110 may generate a special write command WCMD1 based on the logical address, and store the special write command WCMD1 in the normal queue 140.

As described above, the second processing circuit 120 may s process the priority queue 130 prior to the normal queue 140. Therefore, at step S14, the second processing circuit 120 may read the read command RCMD from the priority queue 130 to process first the read command RCMD stored in the priority queue 130 even though any commands are stored in the normal queue 140.

At step S15, the second processing circuit 120 may determine a physical address mapped to the logical address of the read command RCMD by referring to map data MAP, and control the nonvolatile memory device 200 to perform a read operation to the memory region of the physical address. The nonvolatile memory device 200 will read source data SDT1 including the old data of the unaligned data DT1.

At step S16, the second processing circuit 120 may receive the source data SDT1 from the nonvolatile memory device 200. The source data SDT1 may be stored in the buffer 150.

At step S17, if another command is not in the priority queue 130, the second processing circuit 120 may read the special write command WCMD1 from the normal queue 140 to process the special write command WCMD1 stored in the normal queue 140. If other commands which have the same priority as the special write command WCMD1 and are stored previously thereto are in the normal queue 140, the second processing circuit 120 may process the special write command WCMD1 after sequentially processing the commands of the normal queue 140 in a sequence in which they are stored in the normal queue 140. That is, the second processing circuit 120 may process the special write command WCMD1 after processing the commands of the normal queue 140 on a first-come-first-serve basis.

At step S18, the second processing circuit 120 may replace the old data in the source data SDT1 stored in the buffer 150, with the unaligned data DT1.

At step S19, the second processing circuit 120 may control the nonvolatile memory device 200 to write modified source data MDT1 in the memory region of a new physical address, and map the new physical address to the logical address of the unaligned data DT1 in the map data MAP.

Figure 5:
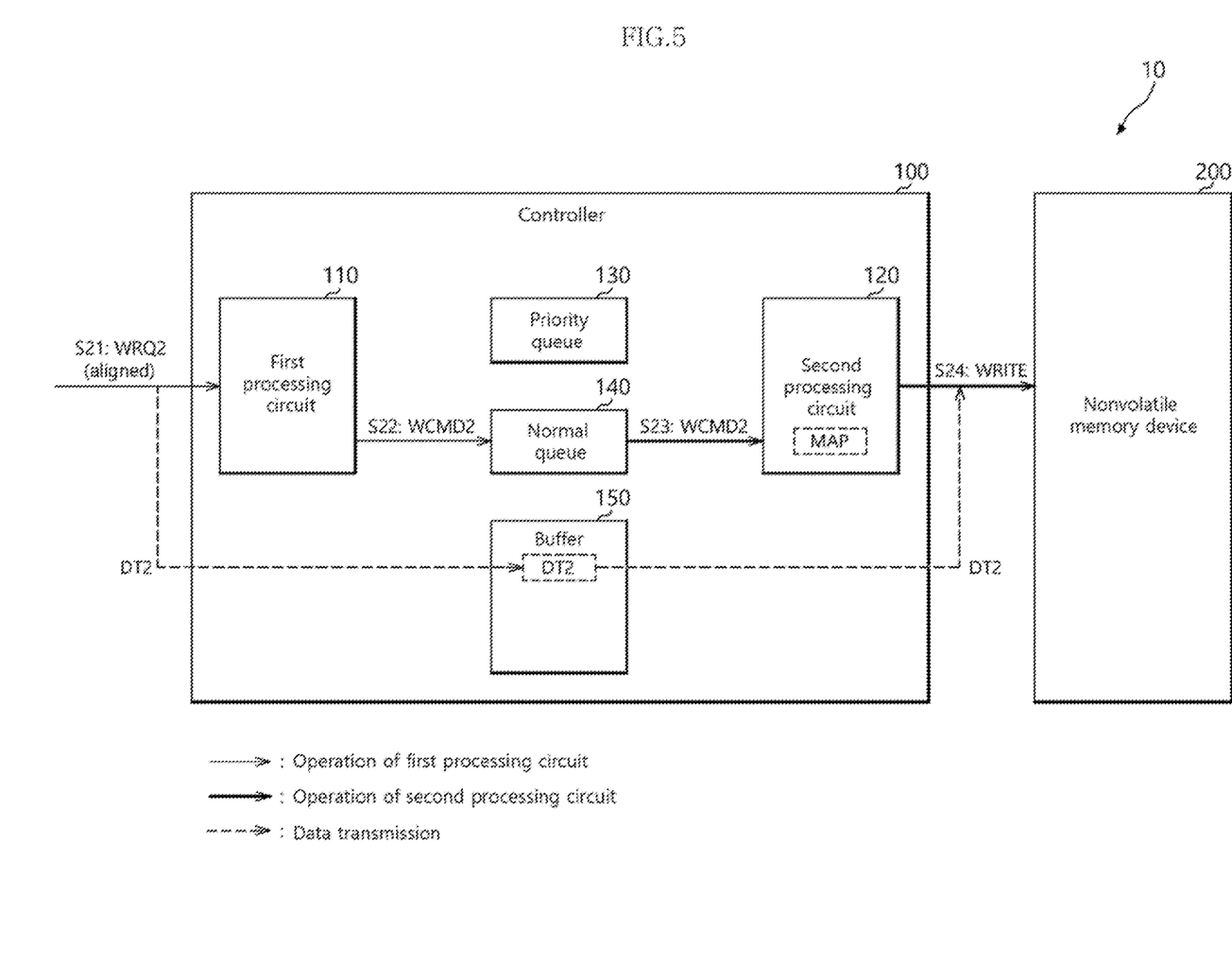
FIG. 5 is a diagram describing a method for the controller of FIG. 1 to process an aligned write request.

FIG. 5 is a diagram describing in detail a method for the controller 100 of FIG. 1 to process an aligned write request WRQ2.

Referring to FIG. 5, at step S21, the first processing circuit 110 may receive the aligned write request WRQ2 provided along with aligned data DT2 from the host device. The aligned data DT2 may be stored in the buffer 150. The aligned write request WRQ2 may include an information on sector addresses allocated to the aligned data DT2.

At step S22, the first processing circuit 110 may generate a normal write command WCMD2 based on a logical address converted from the sector addresses of the aligned data DT2, and store the normal write command WCMD2 in the normal queue 140.

At step S23, if any command is not in the priority queue 130, the second processing circuit 120 may read the normal write command WCMD2 from the normal queue 140 to process the normal write command WCMD2 stored in the normal queue 140. If other commands which have the same priority as the normal write command WCMD2 and are stored previously thereto are in the normal queue 140, the second processing circuit 120 may process the normal write command WCMD2 after sequentially processing the commands of the normal queue 140 in a sequence in which they are stored in the normal queue 140. That is, the second processing circuit 120 may process the normal write command WCMD2 after processing the commands of the normal queue 140 on a first-come-first-serve basis.

At step S24, the second processing circuit 120 may control the nonvolatile memory device 200 to write the aligned data DT2 in the memory region of a new physical address, and map the new physical address to the logical address of the aligned data DT2 in the map data MAP.

Figure 6:
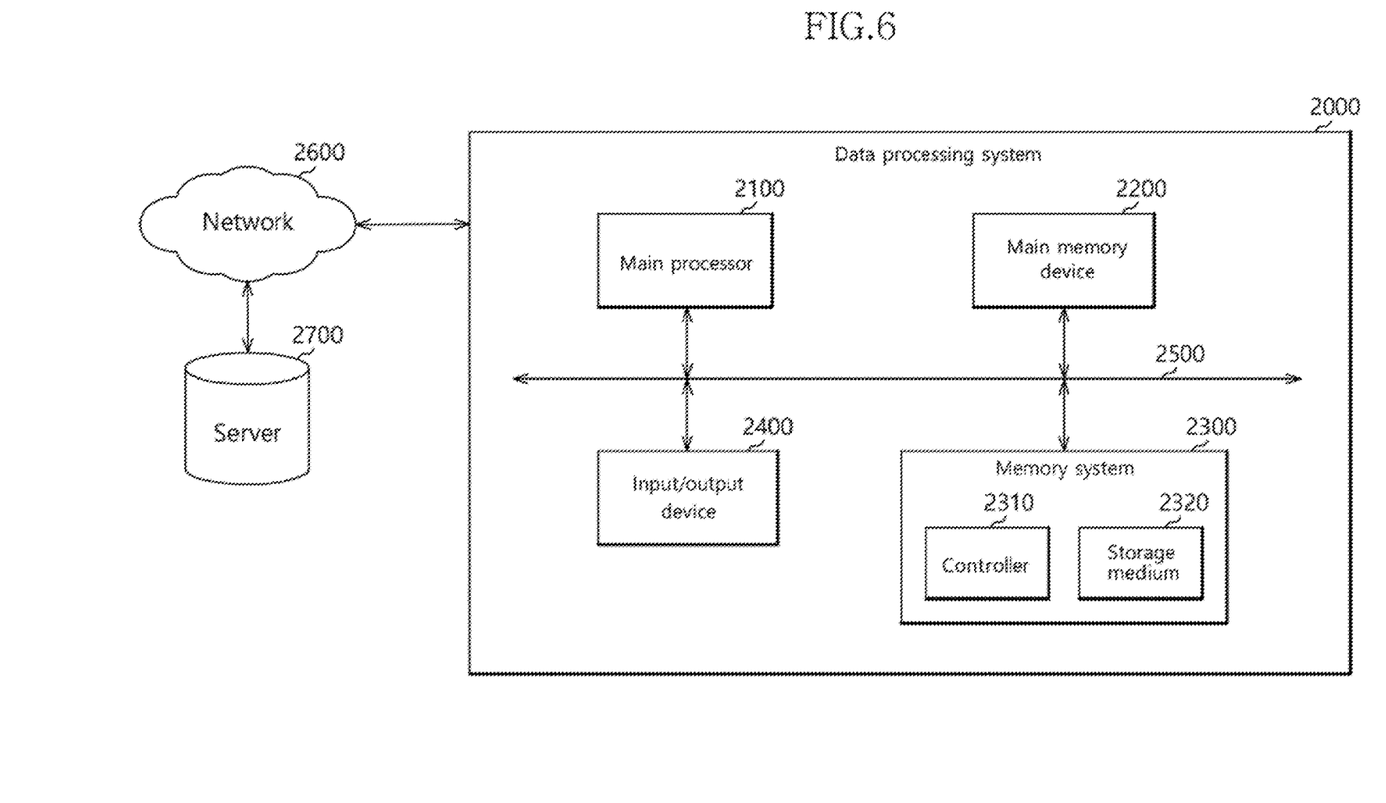
FIG. 6 is a block diagram illustrating an example of an application of the memory system in accordance with one embodiment to a data processing system.

FIG. 6 is a block diagram illustrating an example of an application of the memory system 10 in accordance with one embodiment to a data processing system 2000.

Referring to FIG. 6, the data processing system 2000 may include a computer, a laptop, a netbook, a smartphone, a digital TV, a digital camera, a navigator, etc. The data processing system 2000 may include a main processor 2100, a main memory device 2200, a memory system 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit, such as a microprocessor. The main processor 2100 may execute software such as an operation system, an application, a device driver, and so forth, on the main memory device 2200.

The main processor 2100 may operate in the same manner as the host device described above with reference to FIGS. 1 to 5. That is to say, the main processor 2100 may transmit an unaligned write request and an aligned write request to store data in the memory system 2300.

The main memory device 2200 may store programs and program data to be used by the main processor 2100. The main memory device 2200 may temporarily store data to be transmitted to the memory system 2300 and the input/output device 2400.

The memory system 2300 may include a controller 2310 and a storage medium 2320. The memory system 2300 may be configured and operate substantially similarly to the memory system 10 of FIG. 1.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a Local Area Network (LAN), a Wide Area Network (WAN), a wireless network, and so on. The data processing system 2000 may include a network interface (not shown) to access the network 2600.

While various exemplary embodiments have been described above, it will be understood to those skilled in the art that the embodiments described are examples only. Accordingly, the data storage device and the operating method thereof described herein should not be limited based on the described embodiments. Many other embodiments and or variations thereof may be envisaged by those skilled in the relevant art without departing from the spirit and or scope of the present invention as defined in the following claims.

What is claimed is:

1. A memory system comprising:
a nonvolatile memory device; and
a controller configured to process a write request of first data transmitted from a host device,
the controller comprising
a first processing circuit configured to generate both a write command and a read command based on the write request, the read command having a priority over the write command; and
a second processing circuit configured to process the read command according to the priority before processing the write command, thereby reading second data including old data of the first data from the nonvolatile memory device.

2. The memory system according to claim 1,
wherein the first processing circuit stores the read command in a priority queue, and
wherein the second processing circuit processes commands stored in the priority queue, prior to other commands.

3. The memory system according to claim 1,
wherein the first processing circuit generates the write command based on the write request, and
wherein the second processing circuit generates modified second data by replacing the old data with the first data and writes the modified second data in the nonvolatile memory device based on the write command.

4. The memory system according to claim 3, wherein the first processing circuit affords a priority lower than the priority to the write command.

5. The memory system according to claim 4, wherein, when there is no command afforded with the priority, the second processing circuit processes one or more commands afforded with the lower priority, in a sequence in which the commands are generated.

6. The memory system according to claim 1, wherein the first processing circuit generates the read command when one or more sector addresses allocated to the first data by the host device are unaligned with physical addresses of the nonvolatile memory device.

7. The memory system according to claim 1, wherein the second processing circuit converts one or more sector addresses of the first data into a logical address, determines a physical address mapped to the logical address by referring to map data and reads the second data from a memory region of the physical address based on the read command.

8. A memory system comprising:
a nonvolatile memory device; and
a controller configured to process a write request of first data transmitted from a host device,
the controller comprising
a priority queue and a normal queue;
a first processing circuit configured to generate both a write command and a read command based on the write request, the read command having a priority over the write command, store the read command in the priority queue and store the write command in the normal queue; and
a second processing circuit configured to process the priority queue prior to the normal queue, wherein the second processing circuit reads second data including old data of the first data from the nonvolatile memory device based on the read command.

9. The memory system according to claim 8, wherein the second processing circuit generates modified second data by replacing the old data with the first data and writes the modified second data in the nonvolatile memory device based on the write command.

10. The memory system according to claim 9, wherein the first processing circuit affords a priority lower than the priority to the write command.

11. The memory system according to claim 10, wherein, when there is no command afforded with the priority queue, the second processing circuit processes one or more commands afforded with the normal queue, in a sequence in which the commands are generated.

12. The memory system according to claim 8, wherein the first processing circuit generates the read command when one or more sector addresses allocated to the first data by the host device are unaligned with physical addresses of the nonvolatile memory device.

13. The memory system according to claim 8, wherein the second processing circuit converts one or more sector addresses of the first data into a logical address, determines a physical address mapped to the logical address by referring to map data and reads the second data from a memory region of the physical address based on the read command.

14. A controller comprising:
   first and second queues;
   a first processing circuit configured to, in response to write request for a recent version of unaligned data included in source data, queue in the first queue a read command for the source data including old version of the unaligned data and queue in the second queue a write command for the source data including the recent version; and
   a second processing circuit configured to control the memory device to perform operations in response to commands queued in the first queue prior to commands queued in the second queue.

15. The controller of claim 14, wherein the second processing circuit further updates the source data, which is read from the memory device in response to the read command of the first queue, based on the recent version; and controls the memory device to perform a write operation with the updated source data in response to the write command of the second queue.

* * * * *